(12) United States Patent
Polegato Moretti

(10) Patent No.: US 8,276,294 B2
(45) Date of Patent: Oct. 2, 2012

(54) VAPOR-PERMEABLE ELEMENT TO BE USED IN COMPOSING SOLES FOR SHOES, SOLE PROVIDED WITH SUCH VAPOR-PERMEABLE ELEMENT, AND SHOE PROVIDED WITH SUCH SOLE

(75) Inventor: Mario Polegato Moretti, Crocetta del Montello (IT)

(73) Assignee: GEOX S.p.A., Montebelluna (IT)

( * ) Notice: Subject to any disclaimer, the term of this patent is extended or adjusted under 35 U.S.C. 154(b) by 695 days.

(21) Appl. No.: 12/305,988

(22) PCT Filed: Jun. 20, 2006

(86) PCT No.: PCT/EP2006/005906
§ 371 (c)(1),
(2), (4) Date: Dec. 22, 2008

(87) PCT Pub. No.: WO2007/147421
PCT Pub. Date: Dec. 27, 2007

(65) Prior Publication Data
US 2009/0277047 A1    Nov. 12, 2009

(51) Int. Cl.
*A43B 7/06* (2006.01)
(52) U.S. Cl. .......................... 36/3 R; 36/3 B; 36/59 C
(58) Field of Classification Search .............. 36/3 R, 36/3 B, 30 R, 59 C, 28
See application file for complete search history.

(56) References Cited

U.S. PATENT DOCUMENTS

| | | | | |
|---|---|---|---|---|
| 3,383,782 A * | 5/1968 | McGinnity | .................. | 36/3 A |
| 5,044,096 A * | 9/1991 | Polegato | .................. | 36/3 R |
| 6,408,541 B1 * | 6/2002 | Moretti | .................. | 36/12 |
| 6,508,015 B1 * | 1/2003 | Rauch | .................. | 36/3 B |
| 6,681,500 B2 * | 1/2004 | Moretti | .................. | 36/3 B |
| 6,823,609 B2 * | 11/2004 | Moretti | .................. | 36/30 R |
| 6,839,984 B2 * | 1/2005 | Polegato | .................. | 36/3 B |
| 7,367,141 B2 * | 5/2008 | Polegato Moretti | .................. | 36/3 B |
| 2004/0074107 A1 | 4/2004 | Tuan | | |
| 2005/0126036 A1 * | 6/2005 | Wu | .................. | 36/3 B |

(Continued)

FOREIGN PATENT DOCUMENTS
CN    2121840 U    11/1992
(Continued)

OTHER PUBLICATIONS

U.S. Appl. No. 13/091,355, filed Apr. 21, 2011, Polegato Moretti, et al.

(Continued)

*Primary Examiner* — Marie Patterson
(74) *Attorney, Agent, or Firm* — Oblon, Spivak, McClelland, Maier & Neustadt, L.L.P.

(57) ABSTRACT

A vapor-permeable element to be used in a composition of soles for shoes, including: a supporting frame, which delimits substantially at least one through hole; a membrane impermeable to water and permeable to water vapor and arranged above the supporting frame so as to cover at least the through hole; at least one vapor-permeable or perforated protective layer for the membrane, arranged between the supporting frame and the membrane, so as to cover at least the through hole. The membrane and the protective layer are joined, at least at their perimetric edges, to each other and to the supporting frame. The protective layer, in cooperation with a tread of the sole with which it is associated, is available for contact with the ground during use of the sole.

26 Claims, 4 Drawing Sheets

U.S. PATENT DOCUMENTS

| | | | |
|---|---|---|---|
| 2005/0172513 A1* | 8/2005 | Lechhart et al. | 36/3 B |
| 2005/0229431 A1 | 10/2005 | Gerlin | |
| 2005/0262728 A1 | 12/2005 | Robbins | |
| 2007/0271815 A1* | 11/2007 | Moretti et al. | 36/3 B |
| 2009/0211119 A1* | 8/2009 | Moretti | 36/3 B |

FOREIGN PATENT DOCUMENTS

| | | |
|---|---|---|
| CN | 2563969 Y | 8/2003 |
| DE | 20 2004 000 307 | 11/2004 |
| EP | 1 586 248 | 10/2005 |
| EP | 1 607 015 | 12/2005 |
| JP | 59-187303 | 12/1984 |
| JP | 8-24003 | 1/1996 |
| JP | 2000-201702 | 7/2000 |
| WO | WO 2004028284 A1 * | 4/2004 |
| WO | 2006 010578 | 2/2006 |

OTHER PUBLICATIONS

Office Action mailed Apr. 10, 2012, in Japanese Patent Application No. 2009-515710.

* cited by examiner

VAPOR-PERMEABLE ELEMENT TO BE USED IN COMPOSING SOLES FOR SHOES, SOLE PROVIDED WITH SUCH VAPOR-PERMEABLE ELEMENT, AND SHOE PROVIDED WITH SUCH SOLE

TECHNICAL FIELD

The present invention relates to a vapor-permeable element to be used in the composition of soles for shoes.

BACKGROUND ART

The present invention also relates to soles provided with such vapor-permeable element and to shoes comprising such soles.

Shoes with soles that are impermeable to water and vapor-permeable (permeable to water vapor) and are made of plastic material have now been known for several years.

Their purpose is to allow the escape of the water vapor generated by the foot by sweating; as is known, this sweating is greater at the interface between the foot and the sole.

An important example of this type of sole is disclosed in Italian patent no. 1282196.

The sole disclosed in this patent is structured with a mid-sole provided with a membrane made of a material which is impermeable to water and permeable to water vapor and is associated with a lower protective layer of a material which is resistant to hydrolysis, water-repellent, vapor-permeable and/or perforated, and a tread made of perforated elastomer is joined hermetically to the mid-sole along its perimeter.

Italian patent no. 1293474 discloses a technical evolution of the above described sole.

This patent discloses a sole produced with a particular production method which has allowed to reduce costs and increase manufacturing precision.

Such sole is constituted by a tread which is overmolded on a mold insert constituted by a portion made of perforated plastic material, above which a felt and a membrane made of a material which is impermeable to water and permeable to water vapor are rigidly fixed.

Such membrane is joined hermetically along its perimeter to the portion made of perforated plastic material, which in practice acts as a mid-sole portion and has supporting functions (in cooperation with the tread) for the foot in the region that corresponds to the position of the membrane (the vapor permeation region).

Generally, the insert has such dimensions as to occupy the front portion of the sole, the one that corresponds to the region where the foot sweats the most.

The overmolded tread has a plurality of holes at such insert.

The region for evacuation of the water vapor, however, is limited by the number and areas of the holes of the tread and of the insert; to increase this evacuation area, it would be necessary to increase the number of holes, keeping their diameter small, in order to avoid the penetration of pointed objects which might ruin the membrane by piercing the felt.

One solution is shown for example in WO 2004/028284 by the same Applicant.

This solution uses a sole in which there is a supporting layer, which is provided with a large portion which is diffusely perforated or otherwise vapor-permeable (having, for example, dimensions which are substantially comparable to the length of the sole); the felt and the membrane made of a material that is impermeable to water and permeable to water vapor is positioned above such large portion. Such supporting layer is formed for example by the assembly insole of the shoe on which the sole is to be provided.

A mid-sole with supporting functions is molded perimetrically with respect to the large portion of the supporting layer (the assembly insole), and the tread in turn is overmolded perimetrically thereon; the tread can include studs for contact with the ground which are overmolded directly on the supporting layer.

However, this solution is not ideal in terms of flexibility in the production of shoes with vapor-permeable and waterproof soles that are structured very differently from each other (depending on the technical requirements).

Another solution to the problem of increasing the evacuation of water vapor from a sports and competition shoe is the one disclosed in U.S. Pat. No. 6,817,112 by Adidas International B.V.

This document discloses a sole which is composed of a supporting layer, which is substantially as long as the entire sole and has a plurality of diffusely perforated regions.

A diffusely perforated inner sole is arranged above the supporting layer.

The layer supports two distinct portions of shock absorbing mid-sole, respectively a front portion and a rear portion.

A function of the supporting layer is to allow the various parts of the sole to stay together, constituting the structural connection of the assembly.

The central portion of the supporting layer is not associated with the mid-sole and has some of the diffusely perforated regions connected directly to the outside of the sole.

Other regions of the diffusely perforated regions can be located at the front and rear of the supporting layer; in this case, the mid-soles have large holes (this expression being used to designate a hole on the order of at least one square centimeter) at such regions, so as to allow their connection to the outside of the shoe.

A tread is associated below the mid-soles.

The mid-soles have a certain height in order to ensure the correct distance of the diffusely perforated regions from the ground; such regions in fact must not touch the ground and in practice correspond to ventilation openings for the shoe, which must not be obstructed in order to be able to perform their function.

Moreover, such diffusely perforated regions must be raised from the ground enough to prevent any inflow of liquids into the shoe.

However, this type of sole is extremely particular, since it can be used only for a type of shoe that is particularly raised from the ground and cannot be used in rainy seasons, due to the risk of internal penetration of liquids.

However, the use of a Gore-Tex® membrane, associated with such diffusely perforated regions, is provided as an option.

Actually, in the type of shoe disclosed in the patent cited above it is not possible to use the membrane conveniently, since such membrane is extremely delicate; in order to try to limit any breakage, it is arranged at a considerable distance from the ground, so as to avoid contact with pointed and hard objects.

Moreover, it should be noted that the content of the cited patent is silent about how the membrane is positioned and how to provide a seal in order to prevent the rise of liquids laterally with respect to the membrane, these features being fundamental in order to ensure waterprooffess.

DISCLOSURE OF THE INVENTION

The aim of the present invention is to provide a waterproof and vapor-permeable sole for shoes which solves the problems noted in known types of soles.

Within this aim, an object of the present invention is to provide a vapor-permeable element which allows to compose vapor-permeable and waterproof soles simply and inexpensively.

Another object of the present invention is to provide a vapor-permeable element which allows to compose vapor-permeable and waterproof soles which have mutually different shapes and technical features and have large areas for the evacuation of water vapor.

Another object of the present invention is to provide a vapor-permeable element which allows to compose vapor-permeable and waterproof soles and allows a certain flexibility in design.

Another object of the present invention is to provide a vapor-permeable and waterproof sole and a shoe provided with said sole which can be manufactured simply and inexpensively and is extremely flexible in its composition.

This aim and these and other objects, which will become better apparent hereinafter, are achieved by a vapor-permeable element to be used in the composition of soles for shoes, characterized in that it comprises:
- a supporting frame, which delimits substantially at least one large through hole;
- a membrane which is impermeable to water and permeable to water vapor and is arranged above said supporting frame so as to cover at least said large through hole;
- at least one vapor-permeable or perforated protective layer for said membrane, which is arranged between said supporting frame and said membrane, so as to cover at least said large through hole;
- said membrane and said protective layer being joined, at least at their perimetric edges, to each other and to said supporting frame, said at least one protective layer, in cooperation with the tread of the sole with which it is associated, being available for contact with the ground during use of said sole.

Advantageously, the invention includes a sole for shoes, characterized in that it comprises a vapor-permeable element as described above, in which the membrane that is impermeable to water and permeable to water vapor is joined hermetically and perimetrically to at least one component of the sole, so as to avoid the rise of water through the perimeter of said at least one large hole.

BRIEF DESCRIPTION OF THE DRAWINGS

Further characteristics and advantages of the invention will become better apparent from the description of some preferred but not exclusive embodiments thereof, illustrated by way of non-limiting example in the accompanying drawings, wherein.

WAYS OF CARRYING OUT THE INVENTION

Figure 1:
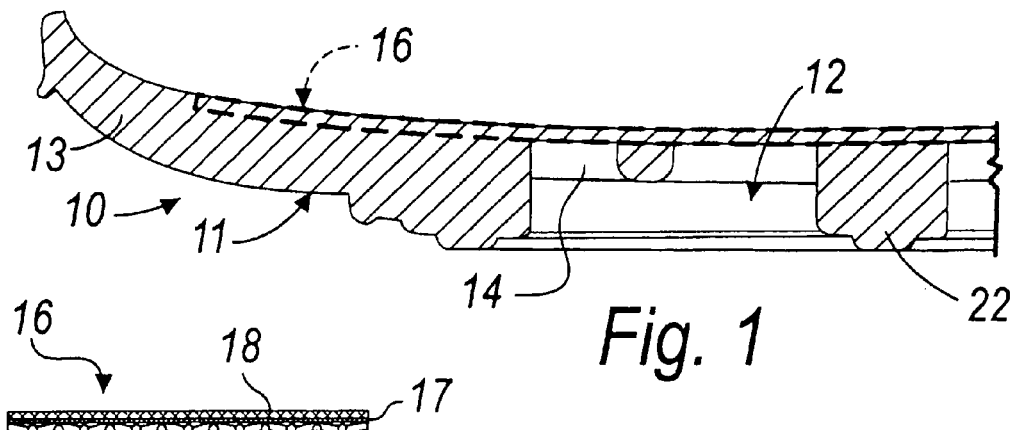
FIG. 1 is a schematic transverse sectional view of a portion of a vapor-permeable element according to the invention.

With reference to the figures, a vapor-permeable element according to the invention is generally designated by the reference numeral 10.

Such vapor-permeable element 10 comprises a supporting frame 11, which is made of plastic material such as thermoplastic polyurethane (TPU), injection-molded rubber (TR), thermoplastic rubber, whose length is substantially comparable to the length of the sole with which it is to be associated.

Figure 7:
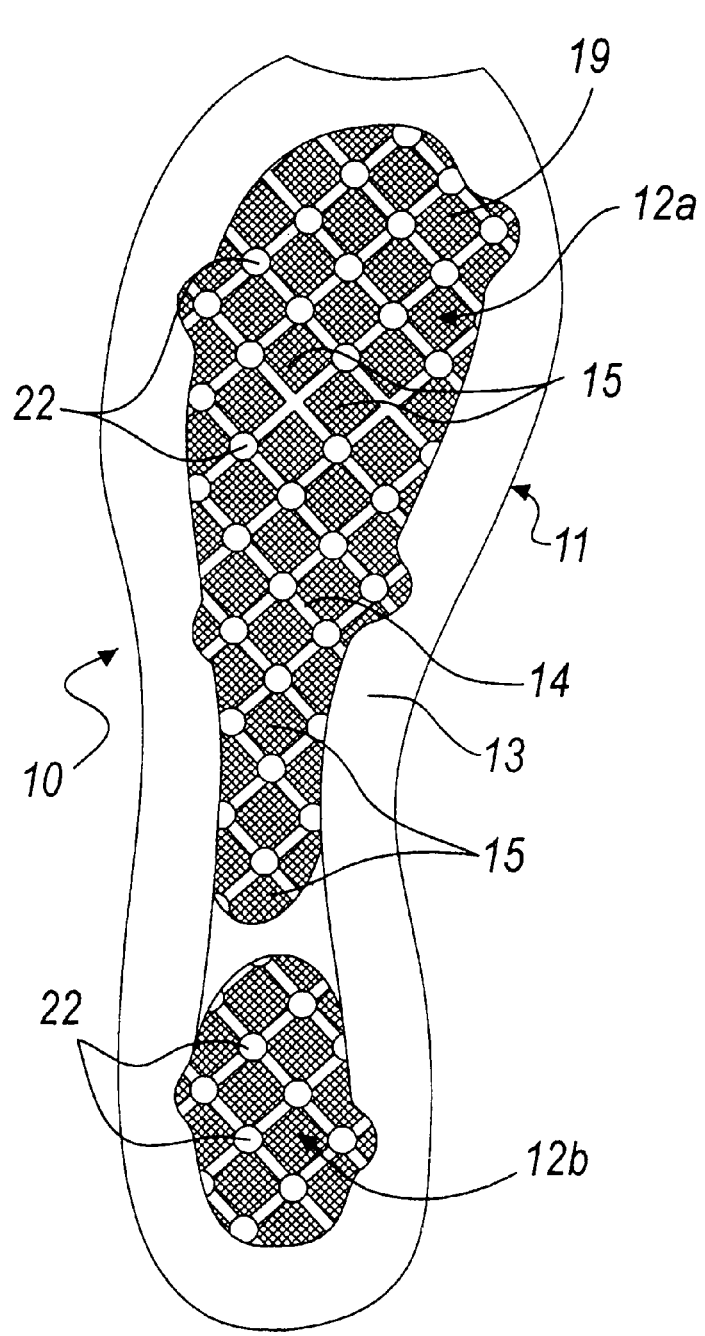
FIG. 7 is a bottom plan view of the vapor-permeable element of FIG. 1.

The supporting frame 11 delimits at least one large through hole 12; in this embodiment, said supporting frame 11 delimits two large through holes 12, respectively a front large hole 12a and a rear large hole 12b, which correspond to the region of the forefoot and the heel (as shown in FIG. 7).

In particular, in this embodiment, the supporting frame 11 is constituted by a perimetric portion 13, which delimits the large through holes 12, and by a structural grid 14, which is monolithic with the perimetric portion 13 and is arranged in the regions that form the large through holes 12; in practice, the structural grid 14 divides the large through holes 12 into a plurality of large through areas 15.

A pack 16 of functional layers, which are superimposed on the large through holes 12 and cover them, is arranged above the supporting frame 11.

The peripheral edges of the pack 16 partially overlap the perimetric portion 13 of the supporting frame 11.

Figure 2:
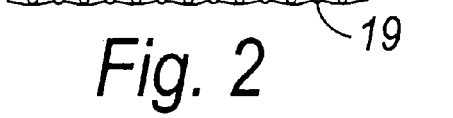
FIG. 2 is a sectional view of a layered pack which composes a vapor-permeable element according to the invention.

The pack 16 is formed (as clearly shown in FIG. 2) by a membrane 17, which is impermeable to water and permeable to water vapor, for example of the type known commercially as Gore-Text, associated, (for example by lamination) with a mesh 18 for supporting it, which is arranged above it and is made of synthetic material; in other embodiments, such mesh may be omitted.

Another waterproof and vapor-permeable membrane that can be used is, for example, the one disclosed in Italian patent no. 01317372 and consists of a layered article which comprises at least one membrane made of hydrophilic polymer, which is coupled to a support formed by fibers of composite material; reference should be made to the content of the cited patent for the detailed description of such layered article.

The pack 16 comprises, below the membrane 17, a protective layer 19 for such membrane.

Such protective layer 19 can be vapor-permeable or perforated and is arranged between the supporting frame 11 and the membrane 17 so as to cover the large through holes 12.

The protective layer 19 has characteristics of resistance to penetration and to wear due to contact with the ground and is constituted, for example, in this embodiment, by a fine mesh.

Such mesh is made of nylon, but it can also be made conveniently of other materials, such as other plastic materials or metallic materials (for example Kevlar).

The protective layer 19 can also be made of a vapor-permeable material, such as for example leather or equivalent materials.

Figure 3:
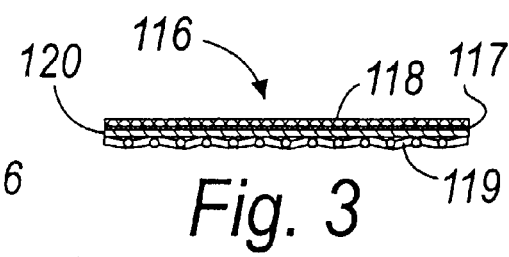
FIG. 3 is a sectional view of a variation of a layered pack with respect to FIG. 2.

FIG. 3 is a view of a variation of the pack 16, now designated by the reference numeral 116, in which an additional vapor-permeable or perforated protective layer 120 is provided, which is arranged between the protective layer 119 (the mesh) and the membrane 117 (laminated to the mesh 118) and is constituted for example by a felt or other material which has similar impact-absorbing properties.

It is evidence that this pack, depending on the technical requirements, can be composed of other layers.

The layers of the pack 16 are mutually joined at least at their peripheral edges, for example by means of one or more of the following technologies: sewing, adhesive bonding, heat-sealing, ultrasound welding, high-frequency welding.

Such layers may also be mutually joined in central regions, for example by spot gluing, so as to avoid compromising the vapor permeability of such pack.

The supporting frame 11 is also joined to the pack 16 at least at its perimetric portion 13.

In particular, in this embodiment the frame 11 is joined to the pack 16 also by means of the portions that correspond to the structural grid 14.

This connection is provided, for example, by molding the supporting frame 11 on the pack 16, in practice forming a molding insert, as described in greater detail hereinafter.

The connection can also be provided according to other methods, such as adhesive bonding, heat sealing, ultrasound welding, high-frequency welding.

In this embodiment, for example, studs 22 for contact with the ground protrude from the structural grid 14.

The supporting frame 11 in fact forms at least partially a tread for the sole that will be composed with the vapor-permeable element 10.

Such tread portion is provided by all the part of the supporting frame 11 (substantially the structural grid 14) that, when the vapor-permeable element 10 composes the sole of a shoe, is in contact with the ground or is arranged in contact with the ground due to the deformation imposed by the weight of the user of the shoe.

It is important to stress that since the protective layer 19 has wear-resistance features, it may also make contact with the ground (particularly in the case of uneven ground) due to the deformation imposed by the weight of the user of the shoe without any risk for its integrity or limitation of its vapor-permeability effect.

The impermeability insured by the membrane prevents the rise of water, dirt and humidity.

In this manner it is possible to provide soles having different heights, both very thin ones and thick ones.

In other embodiments, not shown in the figures, the vapor-permeable element might not have the structural grid 14, support being ensured by the perimetric portion of the supporting frame.

In this case, the protective layer, because of the deformation due to the weight, will very often be in contact with the ground.

It should be noted that a variation (not shown in the figures) of the vapor-permeable element 10 may also comprise a single large hole formed substantially along the entire length of such frame.

As regards the molding of the supporting frame 111 on the pack 16, it is possible to distinguish for example four different solutions.

A first solution is the one shown in FIG. 1, in which the pack 16 is surrounded perimetrically by the supporting frame 11 but without overlapping the peripheral edges of such pack; in this case, as clarified hereinafter, the membrane 17 must be sealed perimetrically when the vapor-permeable element 10 is associated with a corresponding sole.

A seal can be provided in different manners, for example by means of sealing tape (not shown the figures) arranged so as to straddle the peripheral edges of the pack and of the component that surrounds it, or by overmolding a portion of the edge of a mid-sole, below the vapor-permeable element or above it.

In a second solution of a vapor-permeable element, now designated by the reference numeral 210, shown in FIG. 4, the pack 216 is surrounded perimetrically by the supporting frame 211, but without overlapping the peripheral edges of such pack, and a second injection subsequently provides a sealing bead 221 which straddles the perimetric edges of the pack 216 and of the perimetric portion 213.

Figure 5:
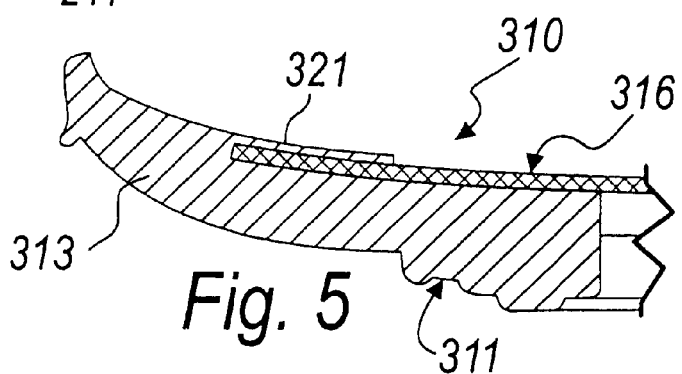
FIG. 5 is a view of another alternative embodiment of a vapor-permeable element with respect to FIG. 1.

In a third solution of a vapor-permeable element, now designated by the reference numeral 310, shown in FIG. 5, the supporting frame 311 overlaps in a sandwich-like fashion the peripheral edges of the pack 316, forming a sealing bead 321 monolithically with the perimetric portion 313.

Figure 6:
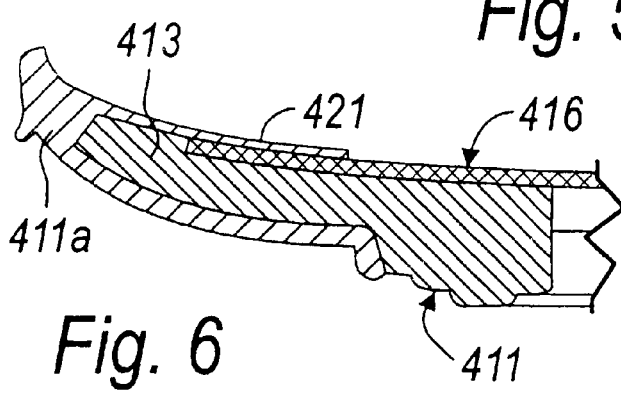
FIG. 6 is a view of another alternative embodiment of a vapor-permeable element with respect to FIG. 1.

In a fourth solution of a vapor-permeable element, now designated by the reference numeral 410, shown in FIG. 6, the pack 416 is surrounded perimetrically by the supporting frame 411 but without overlapping the peripheral edges of such pack 416.

Subsequently, a shell 411a is overmolded at the peripheral region of the supporting frame 411 and covers it in a sandwich-like fashion (forming a bead 421) until it straddles and overlaps the perimetric edges of the pack 216 and of the perimetric portion 413.

This embodiment is useful, for example, in the case of embodiments of two-color vapor-permeable elements.

A vapor-permeable element according to the invention may be used conveniently to compose soles of aesthetically and functionally different types.

It is in fact sufficient to apply to said vapor-permeable element all the components that are useful to provide the technical functions of the designed sole.

Figure 8:
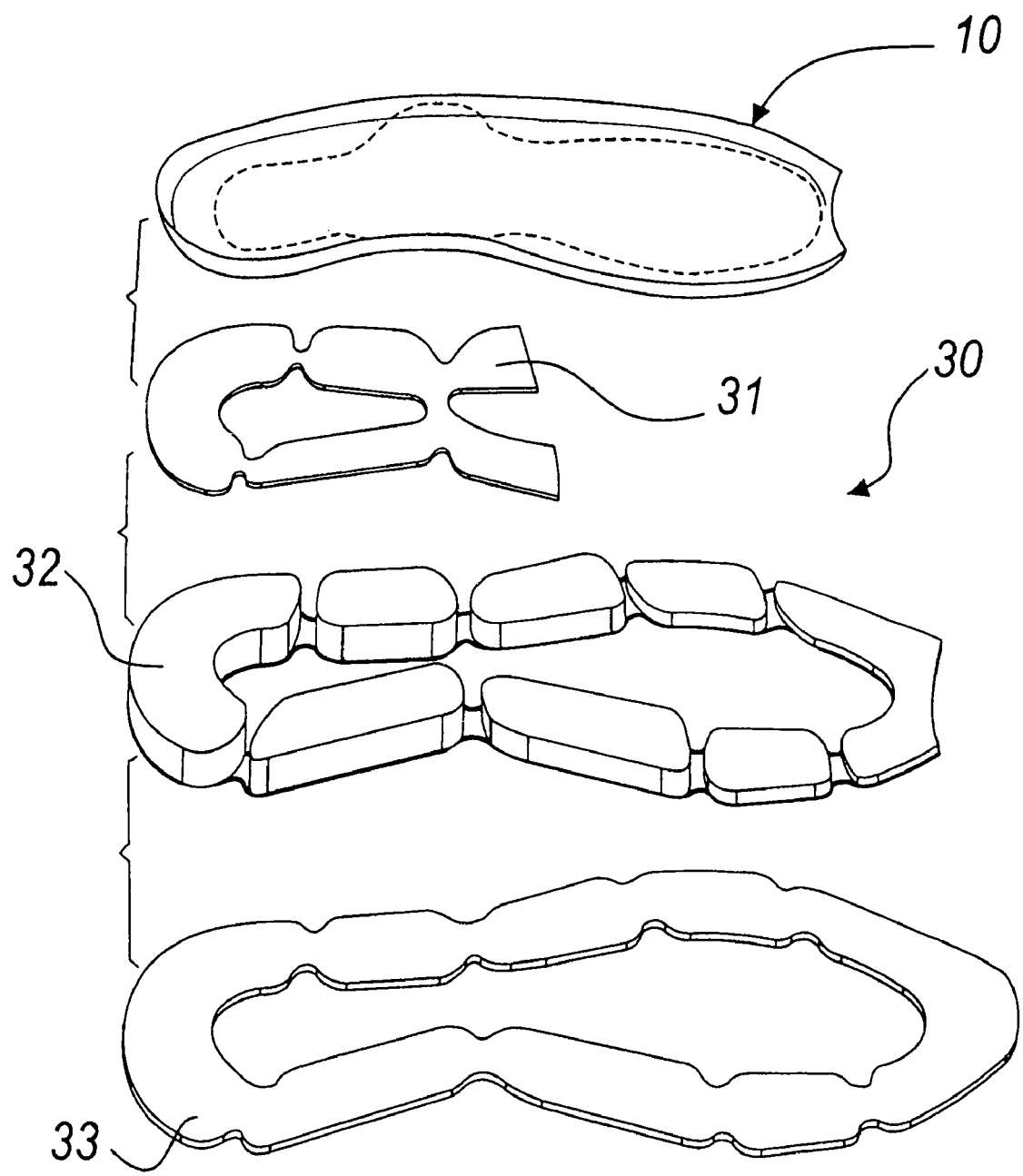
FIG. 8 is an exploded perspective view of a part of a sole which uses a vapor-permeable element according to the invention.
Figure 10:
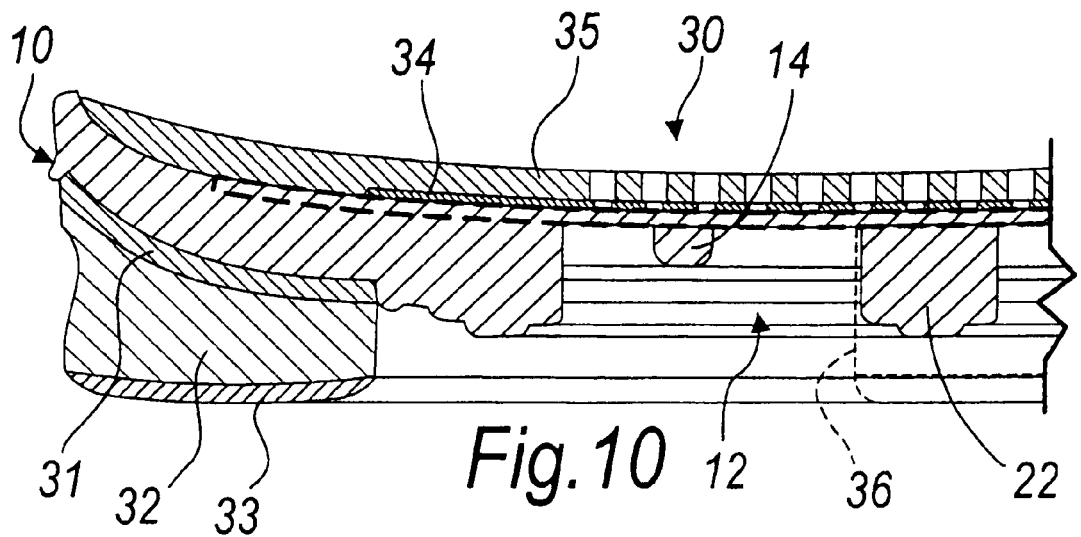
FIG. 10 is a sectional view of a portion of a sole which comprises the sole components shown in FIG. 8.

FIG. 10 shows in cross-section a portion of a sole 30 which uses a vapor-permeable element 10 according to the invention, and FIG. 8 is an exploded perspective view of some components of such sole.

Figure 9:
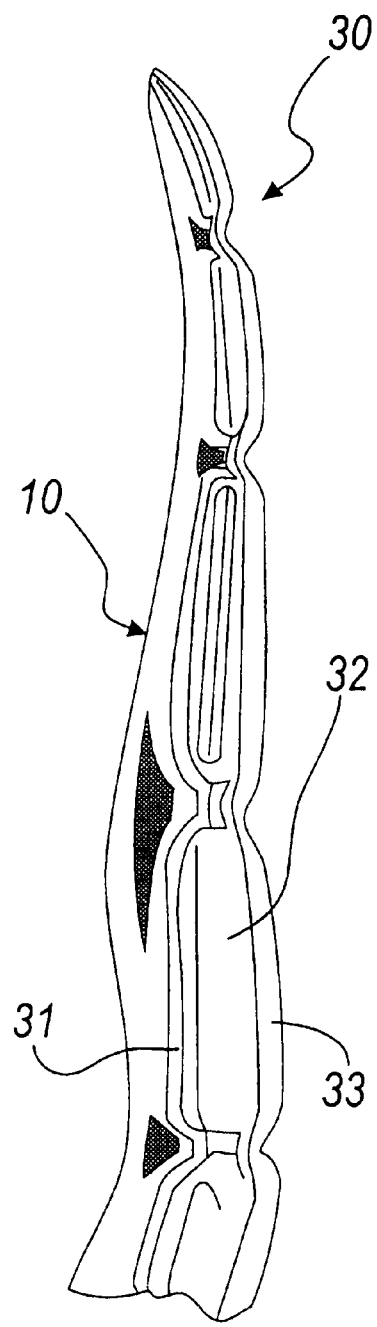
FIG. 9 is a side view of a sole which uses a vapor-permeable element according to the invention, comprising the sole components shown in FIG. 8.

FIG. 9 is a side view of the sole 30.

To allow the sole to be impermeable to water and permeable to water vapor, there must be no infiltrations laterally with respect to the membrane 17 (or 117).

To achieve this, the membrane 17 (or 117) is joined hermetically and perimetrically to at least one component of the sole.

Figure 4:
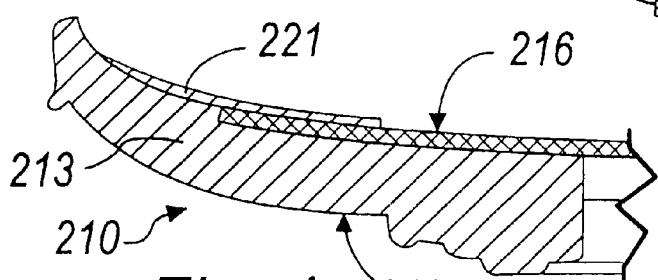
FIG. 4 is a view of an alternative embodiment of a vapor-permeable element with respect to FIG. 1.

Such sole component can be the perimetric frame 11 of the vapor-permeable element 10 itself, as described earlier in the examples of vapor-permeable elements shown in FIGS. 4, 5 and 6, and the seal may occur by overmolding the pack 16.

The membrane 17 (or 117) may also be sealed in other manners (not shown in the figures), for example by overmolding the tread below the vapor-permeable element 10 so as to form a sealing bead which protrudes onto the internal peripheral region of the large holes 12 or by overmolding a mid-sole below or above the vapor-permeable element 10, always forming a sealing bead which respectively protrudes onto the internal peripheral region of the large holes 12 or overlaps the peripheral edges of the pack 16 (in the case of downward overmolding of the sealing bead, it is possible to use conveniently, for example, a pack 16 constituted by a mesh 19 and, directly in contact therewith, the membrane 17).

The sole 30 shown in FIG. 10 (a part of the sole 30 is shown in exploded view also in FIG. 8 and in a side view in FIG. 9) is constituted by the vapor-permeable element 10 (but it is possible equivalently to use any of the variations described earlier and designated by the reference numerals 210, 310, 410), with which a torsional stiffening insert 31 for said sole is associated in a downward region at the rear portion of the sole 30.

The torsional stiffening insert 31 is fixed to the vapor-permeable element 10 substantially without obstructing any large hole 12 (in practice it surrounds the rear large hole 12b).

Below the torsional stiffening insert 31 there is a first shock-absorbing layer 32, which extends substantially along the entire length of the sole and surrounds the large holes 12 without obstructing them.

A tread 33 is provided below the shock-absorbing layer 32 and also extends substantially along the entire length of the sole, following the contour of the shock-absorbing layer 32 and thus surrounding the large holes 12 without obstructing them.

In an upward region with respect to the vapor-permeable element 10 and in contact therewith a diffusely perforated second shock-absorbing layer 34 is provided, and in an upward region with respect to said layer a third shock-absorbing layer 35 is provided which is likewise diffusely perforated, such as for example an inner sole made of expanded polymeric material.

It is possible to associate with the protective layer of the pack 16, at the large holes 12, shock-absorbing studs, one whereof is shown schematically in FIG. 10 in broken lines and is designated by the reference numeral 36, such studs making contact with the ground.

Such studs can be for example overmolded onto the structural grid 14 and onto the protective layer (the mesh).

It is evident that the soles can be composed of different layers and components, even ones that differ from the ones listed here, according to the requirements.

The layers may have different thicknesses according to the requirements; in the accompanying figures, the thicknesses are merely a non-limiting indication.

It is possible to conceive soles with or without a torsional stiffening insert and with or without shock-absorbing layers arranged below or above the vapor-permeable element.

Figure 11:
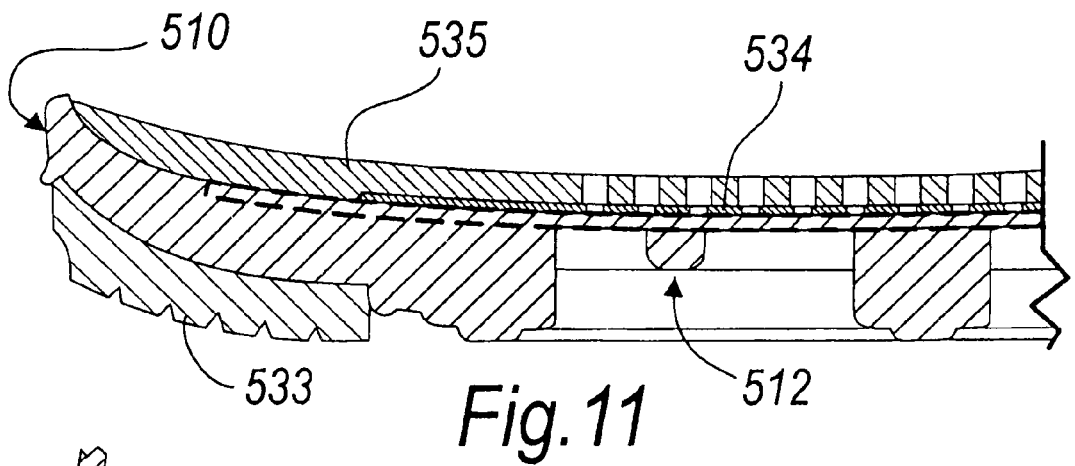
FIG. 11 is a sectional view of another example of a sole which uses a vapor-permeable element according to the invention.

By way of example, it is possible to manufacture a sole 530 (see FIG. 11) which has a vapor-permeable element 510 and, above it, two successive shock absorbing layers 534 and 535; a tread 533 is provided directly below the vapor-permeable element 510, in direct contact therewith, and surrounds the large holes 512, thus providing a thin sole.

With soles that can be structured in this manner it is possible to provide shoes of various kinds, both of the sports type and of the walking type.

Figure 12:
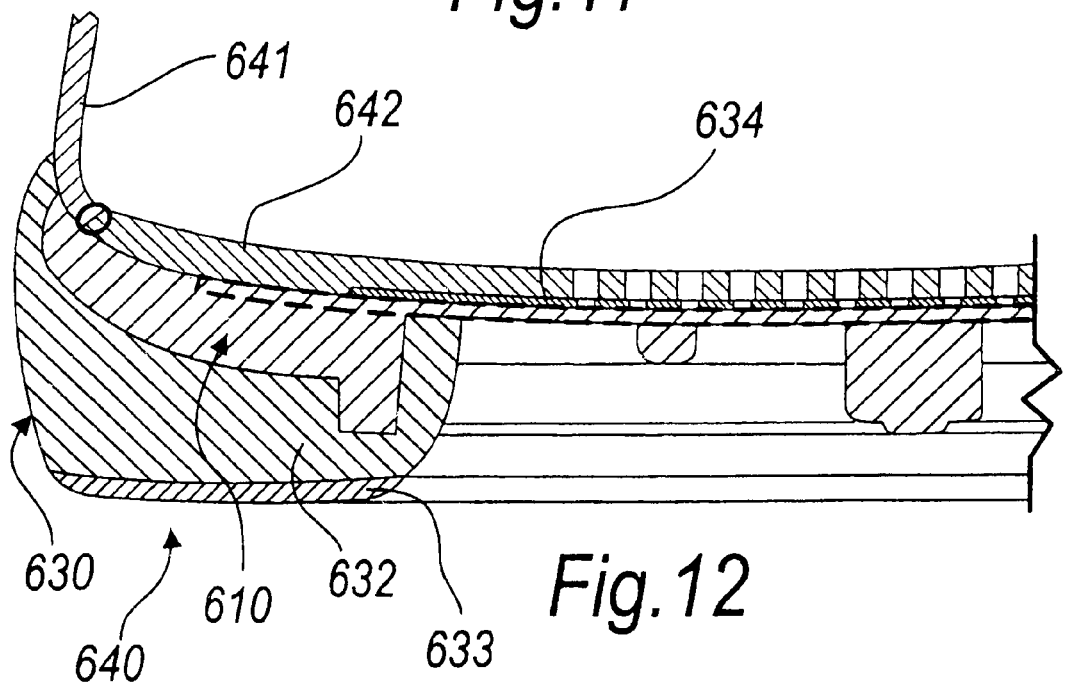
FIG. 12 is a sectional view of a shoe which uses a sole with a vapor-permeable element according to the invention.

A portion of shoe, designated by the reference numeral 640, is shown by way of example in FIG. 12.

Such shoe comprises an upper 641, which is sewn to an insole 642 and is associated with a sole 630.

The sole 630 comprises a vapor-permeable element 610 and, below it, a first shock-absorbing layer 632 and a tread 633; above the vapor-permeable element 610 a second shock-absorbing layer 634 is provided.

The first shock-absorbing layer 632 is provided for example by overmolding and overlaps laterally the lower portion of the upper 614.

As mentioned earlier, the protective layer 19 (or 119) can be arranged in contact with the ground.

In the case of a protective layer such as a mesh (or other perforated layer), in view of its strength, it is possible to use brushes to eliminate any dirt and soil which can accumulate over time within the meshes (or in the holes); it is also possible to assist the cleaning of the protective layer by washing it with water (the sole is impermeable to water).

By way of example, the various shock-absorbing layers can be made of expanded ethyl vinyl acetate (EVA), expanded polyurethane (PU), expanded thermoplastic polyurethane (TPU), latex foam, et cetera.

Again by way of example, the tread can be made of TPU, rubber, EVA, injection-molded polyurethane (TR).

In practice it has been found that the invention thus described solves the problems noted in the manufacture of known types of vapor-permeable and waterproof soles; in particular, the present invention provides a vapor-permeable element which allows to compose thereon number of vapor-permeable and waterproof soles simply and inexpensively.

With this vapor-permeable element, which is furthermore waterproof, it is in fact possible to provide extremely flexible production of a waterproof and vapor-permeable sole which has a large area for evacuation of the water vapor.

A vapor-permeable element according to the invention in fact can be used in a very large number of sole types, from the sports type to the walking type, at the same time ensuring a large vapor permeation surface.

Moreover, such vapor-permeable element allows to compose soles easily by using elements which have different technical characteristics and can be used according to the design requirements.

The invention thus conceived is susceptible of numerous modifications and variations, all of which are within the scope of the appended claims; all the details may further be replaced with other technically equivalent elements.

In practice, the materials used, so long as they are compatible with the specific use, as well as the dimensions, may be any according to requirements and to the state of the art.

The invention claimed is:

1. A vapor-permeable element to be used in a composition of soles for shoes, comprising:
   a supporting frame, which delimits substantially at least one through hole;
   a membrane which is impermeable to water and permeable to water vapor and is arranged above said supporting frame so as to cover at least said through hole;
   at least one vapor-permeable or perforated protective layer for said membrane, which is arranged between said supporting frame and said membrane, so as to cover at least said through hole;
   said membrane and said at least one protective layer being joined, at least at their perimetric edges, to each other and to said supporting frame, said at least one protective layer, in cooperation with a tread of the sole with which it is associated, being available for contact with the ground during use of said sole;
   said supporting frame including a perimetric portion, which delimits said through hole, and a structural grid, which is monolithic with said perimetric portion, and is arranged in a region that forms said through hole; and
   said structural grid includes studs provided thereon for contact with the ground.

2. The vapor-permeable element according to claim 1, wherein said supporting frame forms the tread at least partially.

3. The vapor-permeable element according to claim 1, wherein said vapor-permeable or perforated protective layer has characteristics of resistance to penetration to wear due to contact with the ground.

4. The vapor-permeable element according to claim 3, wherein said vapor-permeable or perforated protective layer is constituted by a mesh.

5. The vapor-permeable element according to claim 4, wherein said mesh is made of plastic material.

6. The vapor-permeable element according to claim 5, wherein said mesh is made of nylon.

7. The vapor-permeable element according to claim 4, wherein said mesh is made of metallic material.

8. The vapor-permeable element according to claim 7, wherein said mesh is made of a para-aramid synthetic fiber.

9. The vapor-permeable element according to claim 3, wherein said protective layer is made of leather.

10. The vapor-permeable element according to claim 1, comprising an additional vapor-permeable or perforated protective layer, which is arranged between said at least one protective layer and said membrane.

11. The vapor-permeable element according to claim 10, wherein said additional vapor-permeable or perforated protective layer is made of felt which has impact-absorbing characteristics.

12. The vapor-permeable element according to claim 1, wherein said supporting frame has a length which is substantially equal to the length of the sole with which it is to be associated.

13. The vapor-permeable element according to claim 12, comprising a single hole formed substantially along the entire length of said frame.

14. The vapor-permeable element according to claim 11, comprising two holes, which are delimited respectively in the front and rear regions of said supporting frame.

15. The vapor-permeable element according to claim 1, wherein said membrane is included with a mesh.

16. The vapor-permeable element according to claim 1, wherein said supporting frame is molded on a pack, which comprises said membrane and said at least one protective layer, said membrane and said protective layer being mutually connected at least at their peripheral edges.

17. The vapor-permeable element according to claim 16, wherein the connection of the peripheral edges of the layers that form said pack is performed by one or more of the following technologies: sewing, adhesive bonding, heat-sealing, ultrasound welding, high-frequency welding.

18. A sole for shoes, comprising:
a vapor-permeable element according to claim 1, said waterproof and vapor-permeable membrane being joined perimetrically and hermetically to at least one component of the sole so as to avoid rise of water through the perimeter of said at least one large hole.

19. The sole for shoes according to claim 18, further comprising a tread element associated in a downward region with said vapor-permeable element.

20. The sole for shoes according to claim 18, further comprising at least one shock-absorbing layer arranged above and/or below said vapor-permeable element.

21. The sole for shoes according to claim 18, further comprising, at least at a rear portion of said sole, a torsional stiffening insert for said sole, which is arranged between said tread element and said vapor-permeable element.

22. A shoe, comprising a sole according to claim 18.

23. The vapor-permeable element according to claim 7, wherein said para-aramid synthetic fiber is poly paraphenylene terephthalamide.

24. The vapor-permeable element according to claim 1, wherein said structural grid has a shape of a first set of lines and a second set of lines, where the first set of lines intersects with the second set of lines.

25. The vapor-permeable element according to claim 24, wherein said studs are provided at and extend from intersections of said first set of lines and said second set of lines.

26. The vapor-permeable element according to claim 25, wherein said first set of lines are parallel to each other, said second set of lines are parallel to each other, and a square shape is formed by the intersection of said first and second set of lines.

* * * * *